Patented Aug. 15, 1944

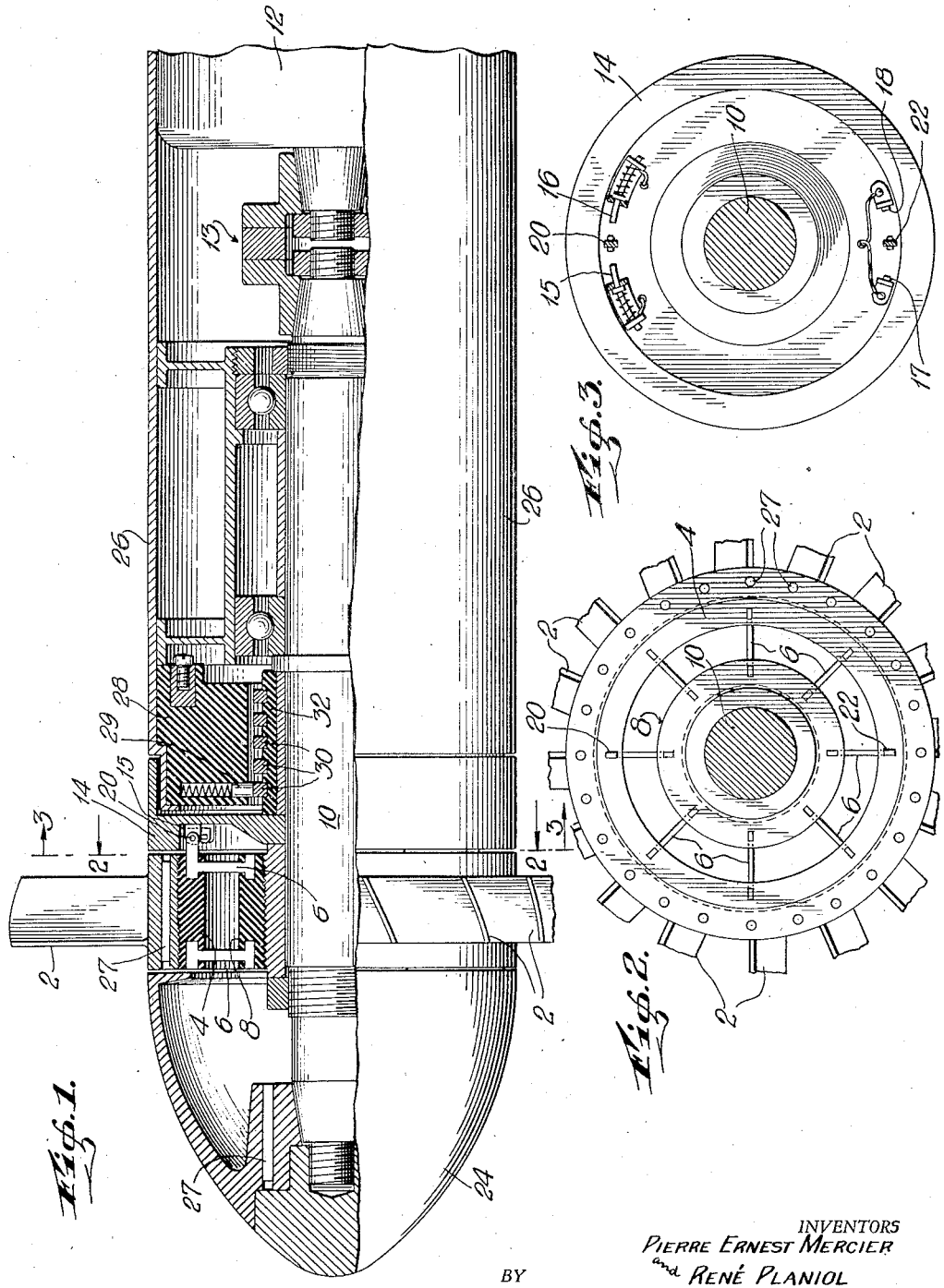

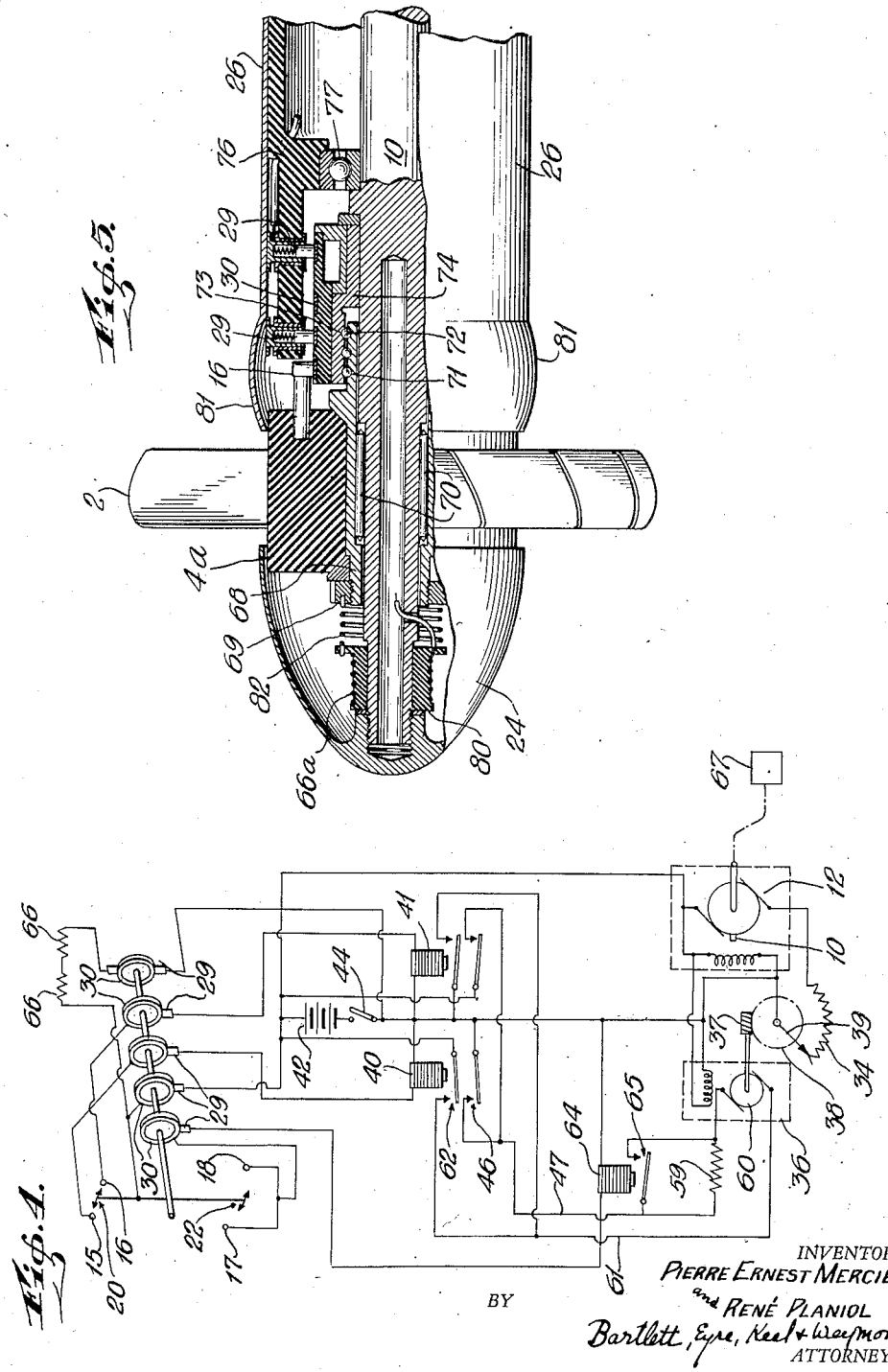

2,355,921

UNITED STATES PATENT OFFICE 2,355,921

AIR-SPEED METER

Pierre Ernest Mercier and René Planiol,
New York, N. Y.

Application April 23, 1943, Serial No. 484,276

4 Claims. (Cl. 73—187)

Our present invention relates to air-speed meters for airplanes and comprises a device of this character which will give accurate indications of the speed of the air relative to the airplane irrespective of the altitude at which the plane is flying and irrespective of the temperature of the air.

Air-speed indicators now in general use fall into two general classifications, namely, those employing Pitot or Venturi tubes which depend upon measurement of pressures and those utilizing air screws which depend upon measurements of the rate of rotation of elements driven by the screws. In the case of meters of the first type it is obvious that changes in density of the air, occasioned by change in altitude of the plane or by temperature changes, or both, will affect the reading of the device and thus render it inaccurate.

In the case of indicators employing air screws, it has generally been believed that the rate of rotation of the air screw would be independent of the air density if the air screw were under no load. But this is not precisely the case for the following reasons. The load of the air screw which is generally considered can be called the "external load," meaning the external work done by the screw in overcoming friction of the bearings and the resisting torque of the speedometer giving the indications. These two loads can be reduced to very small values. For instance, the bearings used to guide the shaft may be ball bearings of very small size and excellent quality. The resisting torque of the speed indicator may also be reduced to a great extent by use of various electrical devices already well known. These two loads comprising the "external load" can thus be made very small but can never be reduced absolutely to zero. There is, however, another type of load which, although generally completely forgotten or ignored, is much more important. This load could be called the "internal load" and is due to the friction of the air and the eddies of the air against the blades. This load cannot be avoided. The so-called free rotation of a screw in the air requires relatively considerable power to overcome these losses. This power is necessarily taken out of the kinetic energy of the wind by the blades of the screw with the result that the blades do not operate at zero incidence. Thus the speed of the usual "freely rotating" screw can never reach exactly the theoretical speed given by the geometrical pitch of the blade, and there is always a correction to be applied to the readings of the speedometer. It could be said that if this correction were to be independent of the density a good result could nevertheless be obtained. The part of the correction coming from the eddies against the blades can be considered as independent of the density because the energy dissipated in eddies, being proportional to the density always requires the same incidence, regardless of the density.

Despite the fact that the coefficient of viscosity of the air, like the friction of the bearings and the resisting torque of the speedometer, is independent of the density of the air, it is a well-known fact that the profile drag of the blades is affected by the air density and also varies with the Reynolds number. Thus for these components of the load the incidence of the air against the blades will vary with the density of the air and a variable correction would have to be applied. For this reason the usual air screw type of meter is not much better than the Pitot tube type.

The air-speed meter of the present invention employs an air screw, but unlike those heretofore in use, does not require the air screw to deliver energy for giving the indication of its speed. Moreover, a certain amount of energy is supplied to the meter in such a way as to balance the frictional losses and nullify the angle of incidence of the air against the blades. Thus the new meter is independent of air density as there is no component of air flow normal to the blade surface. In brief, the new air-speed meter comprises a shaft which is driven at a controllable rate of speed, an air screw carried by the shaft and so mounted thereon as to permit of a limited helicoidal motion thereon of a pitch such as to provide a counterbalance for the frictional forces, and means responsive to such helicoidal motion to adjust the shaft speed to that of the air screw whereby the speed of the shaft is a measure of the speed of the air screw, which latter speed, as the air screw is rotating in accordance with its theoretical pitch, is a true measure of the air speed. Thus no load is placed on the air screw and power is available from the driving means for the shaft for driving any suitable indicating mechanism.

For a better understanding of the invention, reference may be had to the accompanying drawings, of which—

Fig. 1 is a longitudinal sectional view, partly in elevation, of an air-speed meter constructed according to the invention;

Figs. 2 and 3 are sectional views taken along the lines 2—2 and 3—3 respectively of Fig. 1;

Fig. 4 is a circuit diagram of the electrical equipment; and Fig. 5 is a view similar to Fig. 1 and illustrating a modification.

In the embodiment of the invention illustrated in Figs. 1 to 3, an air screw comprising blades 2 which have the same pitch throughout their lengths and a hollow hub 4 of insulating material is mounted by means of flat spring elements 6 on an insulating ring 8. Ring 8 is rigidly mounted on a shaft 10 driven by an electric motor 12 through a coupling 13. Mounted on the shaft 10 immediately in the rear of the hub 4 of the air screw is a disk 14 which carries two pair of contacts 15, 16 and 17, 18, as shown in Fig. 3. The hub 4 of the air screw carries a contact 20 positioned to engage contacts 15 or 16 upon rotation of the air screw relative to the shaft 10. A contact 22, also carried on the hub 4, engages either of contacts 17 and 18 when the rotation of the air screw relative to the shaft 10 exceeds a predetermined value. Contacts 15 and 16 are yieldingly mounted and are separated by a smaller arc than contacts 17 and 18 for a purpose hereinafter described in connection with Fig. 4.

The forward end of the shaft 10 carries a stream-lined hub 24 and a fixed cowling 26 encloses the shaft and motor. This provision of the hub 24 rotating with the shaft 10 and separated from the air screw is important in reducing the aerodynamical losses of the measuring part of the device.

The hub 24 and also the hub 4 of the air screw are provided with holes or passages 27 for reception of heating wires (not shown) for deicing purposes. In the air-speed meter of the present invention the deicing problem is easy to solve for two reasons. First, because of the high sensitivity readily obtained by the meter, the blades can have a low aspect ratio, that is, a relatively large area compared to their length and hence a high thermal conductivity, and second because there will be but little overspeed, which is the main cause of the formation of ice, due to the fact that the blades will be working at zero incidence and can be of the type having a symmetrical profile with a maximum thickness located near the middle of the chord of the blade.

Mounted within the cowling 26 and fixedly secured thereto is an annular insulating block 28 which carries brushes 29 for engagement with conducting rings 30 mounted on an insulating sleeve 32 on the shaft 10. Only one brush 29 appears in the section illustrated in Fig. 1; the other brushes being located, of course, in different radial planes.

In order not to complicate the drawings, the electrical wiring is not shown in Fig. 1. It will be apparent, however, that the rings 30 and the brushes 29 provide the electrical connections between the moving and fixed parts of the electrical circuit, and these rings and brushes are included in the circuit diagram of Fig. 4 to which reference may now be had.

As shown in Fig. 4, the electric motor 12, driving the shaft 10, has a variable resistance 34 in its armature circuit and this resistance is adjusted by a small reversible electric motor 36 through a worm gear 37 meshing with a large gear 38; rotation of gear 38 varying the resistance 34 in the armature circuit of motor 12 by variation in the position of the contact arm 39. Motor 36 is energized only when contact 20 on hub 4 engages one or the other of the contacts 15 and 16 indicating that shaft 10 and the air screw have a tendency to rotate at other than the exact same speed. Closure of contacts 20 and 15 closes the circuit through a relay 40; the circuit being from the main battery 42 through the hand switch 44, (closed in operation) through relay 40, one brush 29 and one ring 30, contact 15, contact 20 and back to the battery through another ring 30 and brush 29. Energization of relay 40 closes the armature circuit of motor 36 as follows: from the battery through switch 44, contacts 46 closed by relay 40, wire 47, resistance 59, armature 63 of motor 36, wire 61 and through the other pair of contacts 52 controlled by relay 40 to the battery. When contact 20 on hub 5 engages contact 16, relay 41 is similarly energized and motor 36 operated except that the direction of current through the armature is reversed. Thus, when the rate of rotation of shaft 10 tends to exceed that of the air screw, contacts 20 and 15 close to cause motor 36 to operate in a direction to increase the resistance 34 in the armature circuit of motor 12 and hence to reduce the rate of rotation of the shaft 10 to that of the air screw. Conversely when the rate of rotation of the shaft tends to be lower than that of the air screw, contacts 20 and 16 close to cause motor 36 to operate in the other direction and thus to decrease resistance 34 and thereby increase the rate of rotation of the shaft 10. As heretofore indicated and as shown in Fig. 3, contacts 15 and 16 are yieldingly mounted on the disk 14 and contacts 17 and 18 are spaced relatively further apart than contacts 15 and 16. The purpose of this arrangement is to insure a relatively more rapid shift in the value of the resistance 34 when the rate of rotation of the shaft differs substantially from the value corresponding to the speed of the plane at the moment, as for example, at take-off. Contact 22 on hub 4 is connected to the battery through the same ring and brush as is contact 20. Contacts 17 and 18 are connected together and, through a fourth ring and brush, to one end of a solenoid 64, the other end of which is connected to the battery 42 through switch 44. Energization of solenoid 64, which thus occurs only after engagement of contact 20 with either of contacts 15 and 16 and continued lack of parity of the rate of rotation of the shaft 10 and the air screw, cuts the resistance 59 out of the armature circuit of motor 36 by closure of contacts 65, thus increasing the rate of rotation of motor 36 and insuring a rapid correction of the rate of rotation of motor 12.

Coils 66 in Fig. 4 represent the deicing wires positioned in the slots 27 of Fig. 1. As shown they may be connected in series, with one end of one coil 66 connected to the positive end of the battery 42 through the same ring and brush as connects contacts 20 and 22 to the battery and with the end of the other coil connected to the negative end of the battery through the fifth ring and brush and switch 44. The motor 12, in addition to driving the shaft 10, may drive any suitable indicating device, as for example, the tachometer 67 diagrammatically illustrated in Fig. 4. The tachometer 67 or equivalent indicating mechanism may be located at any point on the airplane convenient for observation by the pilot or other crew member. Motor 36 and other fixed parts of the electrical equipment may be located with the cowling 26 either in advance of, or in the rear of, motor 12. The entire device, including the cowling 26, air screw and hub 24 will be, of course, so mounted on a wing or other part of the airplane as to present the air screw to an unobstructed flow of air during flight of the plane.

The circuit diagram of Fig. 4 represents but one of many possible arrangements which might be employed to adjust the rate of rotation of the shaft 10 to that of the air screw. Equivalent electrical or electro-mechanical arrangements for part or all of the circuit of Fig. 4 will occur to those skilled in the art.

In the embodiment of the invention illustrated in Figs. 1 to 3 it is the springs 6 which permit the limited helicoidal motion of the air screw on the shaft. When each pair of springs 6 is positioned in the plane of symmetry of the aerodynamic equivalent chord of a blade, correct helicoidal motion of the air screw on the shaft is insured. This requirement as to the location of the springs 6 follows from theoretical considerations and will be made clear in connection with the calculations hereinafter given. In Fig. 1, which is more or less diagrammatic, the springs 6 have been shown as in the same geometrical plane as the axis of the shaft. It will be understood, of course, that the springs 6 will in practice be positioned in the correct planes, as above defined, and that the showing thereof in Fig. 1 is only for convenience.

Instead of providing a resilient coupling between the air screw and the driven shaft, as by the springs 6 of Fig. 1, an arrangement wherein the air screw is screw-threadedly mounted on the shaft may be employed. Such a coupling is illustrated in Fig. 5, to which reference may now be had.

In Fig. 5 the hub 4a of the air screw is rigidly secured on a sleeve 68 as by a nut 69. Sleeve 68 is rotatably carried on the shaft 10 by ball-bearings 70. The sleeve 68 extends rearwardly of the hub 4a and is provided with an external helical groove 71 which, through ball-bearings 72, cooperates with a similar helical groove 73 in the inner surface of a member 74 carried by the shaft 10 so as to rotate therewith. Thus the grooves 71 and 73 and ball-bearings 72 permit limited helicoidal motion of the air screw on the shaft 10, as in the case of the springs 6 of the embodiment of the invention illustrated in Figs. 1 to 3.

A helical spring 82, one end of which is secured to the sleeve 68 and the other end of which is secured to the shaft 10 or to a part rotating therewith, tends to maintain the air screw in the equilibrium position with the contacts carried thereby intermediate the contacts carried by the parts rotating with the shaft. The spring 82 should be weak enough so as to offer but small opposition to the relative rotation of the air screw on the shaft.

In Fig. 5 the member 74 carries the collecting rings 30 and the pairs of contacts 15, 16 and 17, 18 (of which but one shows in the sectional view) for cooperation with the contacts carried by the hub 4a. A block 76 secured to the cowling 26 carries bearings 77 for the shaft 10 and the brushes 29 for contacting the collecting rings on the member 74. The operation of the device of Fig. 5 will be clear from that already given in connection with Figs. 1 to 4 as the same electrical circuit is applicable thereto. Various constructional features of the device of Fig. 5 differ however from that of Fig. 1. For example, in Fig. 5 we have shown one coil 66a mounted on a sleeve 80 on the shaft 10 as the deicing means for the hub 24. Deicing means for the blades 2 corresponding to the slots 27 of Fig. 1 for reception of heating wires could, of course, be added if necessary or desired. Where a member such as disk 14 of Fig. 1 rotating with the shaft is not provided to prevent breaking of the air stream in the rear of the air screw, the cowling adjacent the air screw should be streamlined, as indicated at 81 in Fig. 5.

As heretofore indicated, the helical grooves 71 and 73 cooperating through the balls 72 of Fig. 5 correspond to the spring connections 6 of Fig. 1 which connect the air screw to the rotating shaft. In order to insure that the air screw is under no load it is important that the pitch of these grooves be such that the equivalent chord of the blade would be displaced perpendicular to itself during the helicoidal motion of the screw on the shaft. This requirement follows from theoretical considerations.

The global action of the air against the air screw is equivalent to a force F acting along the direction of the shaft and to a torque N, the axis of which is also along the shaft. When, due to differences in the rates of rotation of the shaft and air screw, the air screw has a small helicoidal motion on the shaft it travels a longitudinal distance $dx$ along the shaft and rotates through an angle $d\phi$ about the shaft. The total work $dW$ will thus be $$Fdx + Nd\phi$$

The ratio F/N, as hereinafter demonstrated, is constant and therefore we may write $$dW = N(Kdx + d\phi) \qquad (1)$$

where $K = F/N$. But $$\frac{dx}{d\phi}$$

is related to $q$, the pitch of the helicoidal motion of the air screw on the shaft by the relation $$\frac{dx}{d\phi} = \frac{q}{2\pi}$$

and hence, for the work to be zero, the requirement is that $$\frac{q}{2\pi} = \frac{dx}{d\phi} = \frac{-1}{K} = \frac{-N}{F} \qquad (2)$$

in which case the equilibrium position corresponds to zero incidence of the relative wind against the blade surfaces.

To determine this value of $q$ for which the work is zero and also to demonstrate that F/N is constant, we first consider the resultant of forces acting on the aerodynamical equivalent chord of a blade. As is known to those skilled in the art, the location of the aerodynamical equivalent chord of a blade, that is, the theoretical chord upon which the resultant of all the forces on the blade can be considered as acting, may be determined for any blade from the structure and physical dimensions thereof. If $\theta$ is the angle of this chord with the axis, R the distance from the axis and $p$ the pitch of the blade, then $$\tan \theta = \frac{2\pi R}{p}$$

and as $p$ is very large compared to R, we may write $$\tan \theta = \theta = \frac{2\pi R}{p}$$

Then if T is the total thrust of the air at zero incidence of the blade, we have $$F = T \cos \frac{2\pi R}{p} \qquad (3)$$

and $$N = RT \sin \frac{2\pi R}{p} \qquad (4)$$

the ratio of which is constant. That is $$\frac{F}{N} = K = \frac{1}{R} \cot \frac{2\pi R}{p} \qquad (5)$$

Then for a helicoidal motion of the air screw on the shaft we have $$W = Fq + 2\pi N$$

or substituting the values of F and N from Equations 3 and 4 we have $$W = Tq \cos \frac{2\pi R}{p} + 2\pi RT \sin \frac{2\pi R}{p} \qquad (6)$$

From Equation 6 it is apparent that the work W will be zero when $$\frac{2\pi R}{q} = -\cot \frac{2\pi R}{p} \qquad (7)$$

which is satisfied when the helicoidal motion permitted the air screw is normal to the equivalent chord of the blade.

Thus condition is satisfied by the location of the springs 6 of Fig. 1 in the plane of symmetry of the aerodynamical equivalent chord of a blade as the springs, being flat are yielding only in directions normal to their surfaces, and is likewise satisfied by the stated pitch of the grooves 11 and 13 of Fig. 5.

A more general demonstration that the ratio F/N is constant is as follows:

If as before $p$ is the pitch of the blades and if $\omega$ is the angular velocity and V the aerodynamical speed, we have $$p = \frac{2\pi V}{\omega}$$

The relative wind against a small element $d\sigma$ of surface of the blade has a velocity V' given by:

$$V' = \sqrt{V^2 + R^2 \omega^2} = \sqrt{V^2 + R^2 \frac{4\pi^2 V^2}{p^2}}$$

R being the distance of $d\sigma$ to the axis of revolution. If we put $$P = \frac{p}{2\pi}$$

we obtain:

$$V' = V\sqrt{1 + \frac{R^2}{P^2}}$$

For a given density and temperature the tangential forces in combination with the resultant of the differential pressure upon $d\sigma$ are:

$$dT = Cf\left(\frac{VL}{\nu}\right) d\sigma V'^2 = Cf\left(\frac{VL}{\nu}\right) d\sigma V^2 \left(1 + \frac{R^2}{P^2}\right) \qquad (8)$$

where C is a constant and $f$ $$f\frac{VL}{\nu}$$

is a function of the Reynolds number. Generally it is assumed that $$f\left(\frac{VL}{\nu}\right) = \left(\frac{VL}{\nu}\right)^{-0.15} \qquad (9)$$

The angle of this force $dT$ with the axis is equal to the tangent to the theoretical helicoid passing at the center of $d\sigma$. Calling this angle $\theta$, we have $$\theta = \tan^{-1}\frac{2\pi R}{p} = \tan^{-1}\frac{R}{P}$$

As we are using great values of the pitch diameter ratio we can take $$\tan \theta = \theta$$

and thus we have for the component of $dT$ parallel to the axis $$dF = Cf\left(\frac{VL}{\nu}\right) d\sigma V^2 \left(1 + \frac{R^2}{P^2}\right) \cos \frac{R}{P}$$

For a given altitude and temperature function $$f\left(\frac{VL}{\nu}\right)$$

does not vary appreciably save for variations of the value of $$\frac{VL}{\nu}$$

reaching several times its initial value. In our case the function has practically the same value along the total length of the blade. Hence it may be considered that for any speed in the normal speed range of the machine and for any temperature and pressure we shall have:

$$F = Cf\left(\frac{VL}{\nu}\right) V^2 \iint_\Omega \left(1 + \frac{R^2}{P^2}\right) \cos \frac{R}{P} d\sigma \qquad (10)$$

$\Omega$ being the total surfaces of the blades. In the same way the component $dF'$ of the aerodynamical action which is perpendicular to the radius and to the axis can be written $$dF' = Cf\left(\frac{VL}{\nu}\right) d\sigma V^2 \left(1 + \frac{R^2}{P^2}\right) \sin \frac{R}{P}$$

which given an elementary torque $$dN = Cf\left(\frac{VL}{\nu}\right) d\sigma R V^2 \left(1 + \frac{R^2}{P^2}\right) \sin \frac{R}{P}$$

and total torque of $$N = Cf\left(\frac{VL}{\nu}\right) V^2 \iint_\Omega R\left(1 + \frac{R^2}{P^2}\right) \sin \frac{R}{P} d\sigma \qquad (11)$$

and finally from Equations 10 and 11 we have the ratio:

$$\frac{F}{N} = \frac{\iint_\Omega \left(1 + \frac{R^2}{P^2}\right) \cos \frac{R}{P} d\sigma}{\iint_\Omega R\left(1 + \frac{R^2}{P^2}\right) \sin \frac{R}{P} d\sigma} \qquad (12)$$

which is independent of V and of the Reynolds number and therefore constant.

We may then for the general case also write $$\frac{F}{N} = K \qquad (13)$$

The invention has now been described in connection with two embodiments thereof, in each of which true air speed indication is obtained from a freely rotating unloaded air-screw.

In each illustrated embodiment of the invention the speed of a driven shaft is automatically brought to that of the air screw, with the result that measurement of the speed of rotation of the shaft, when such speed is constant, is a true measure of the rate of rotation of the air screw, and hence of the air speed relative to the airplane. Two alternative arrangements for mounting the air screw on the driven shaft to permit relative rotation thereof have been described. Other suitable arrangements will occur to those skilled in the art.

In each embodiment of the invention as above described the air screw rotates in accordance with its theoretical pitch, that is, with zero incidence, as the pitch of the helicoidal motion of the air screw on the shaft is such that no work is required of the air screw and the forces acting along the axis of rotation are counterbalanced by the torque developed by the power supplied by the driving means for the shaft. That is, both the "external" and the "internal" loads of the air screw are cancelled. In the usual air-speed meter using an air screw neither of these loads is completely cancelled. If the air screw of our device were mounted on the shaft so as to have a circular rotation, as distinguished from the described helicoidal rotation, thereon the "external" load only would be cancelled and such an arrangement which is superior to air-speed meters now in use, but inferior to our preferred arrangement, is within the scope of the present invention. In such an arrangement, in the case of the air speed meter of Figs. 1 to 3 the springs 6 would be positioned in the radial planes indicated in Figs. 1 and 2, and in the case of the device of Fig. 5, grooves 71 and 73 would be circular instead of helicoidal so as to permit free rotation of the screw on the shaft. When the "external" load only is cancelled, the blades of the screw operate with a small angle of incidence which will vary as a function of the altitude, air density and speed. The construction of the device will, however, be somewhat simpler and hence might be advantageously employed when the highest precision is not required. The deicing problem is somewhat more difficult in the case where the blades are not working at zero incidence as overspeed is greater under such conditions. We prefer, therefore, to so construct our new air-speed meter as to have the blades operating at zero incidence as hereinbefore described, but do not wish to be limited thereto except as defined in the appended claims.

We claim:

1. An air-speed meter for aircraft comprising in combination a rotatable shaft, driving means therefor, an air screw comprising blades and a hollow hub, flat springs constituting resilient connections between said shaft and said hub permitting limited relative rotation of the air screw on the shaft, each spring being positioned substantially in the plane of symmetry of the equivalent chord of a blade so as to flex in directions normal thereto whereby the rotation of said screw is maintained in accordance with its theoretical pitch, and means responsive to rotation of the air screw relative to the shaft and controlling said driving means to maintain the rate of rotation of the shaft equal to that of the air screw.

2. An air-speed meter for aircraft comprising in combination a rotatable shaft, driving means therefor, an air screw comprising blades and a hollow hub carried by said shaft, co-operating means carried by said hub and said shaft for permitting helicoidal motion of the hub relative to said shaft, said co-operating means comprising members carried by said hub and said shaft having alined helical grooves and a plurality of ball-bearings coupling the grooves together, the pitch of said grooves being such that the rotation of the screw relative to the shaft displaces the equivalent chord of a blade of the air screw normally to itself, and means responsive to said helicoidal motion for adjusting said driving means in a direction to nullify such motion and maintain the rotation of said air screw in accordance with its theoretical pitch.

3. An air-speed meter for aircraft comprising in combination a rotatable shaft, driving means therefor, an air screw comprising blades and a hollow hub carried by said shaft, co-operating means carried by said hub and said shaft for permitting limited helicoidal motion of the hub relative to said shaft, said co-operating means including a coiled spring secured to said hub and to said shaft and also members carried by said hub and shaft having alined helical grooves and a plurality of ball-bearings coupling the grooves together, the pitch of said grooves being such that the rotation of the screw relative to the shaft displaces the equivalent chord of a blade of the air screw normally to itself, and means responsive to such motion and adjusting said driving means in a direction to nullify such motion and maintain the rotation of said air screw in accordance with its theoretical pitch.

4. An air-speed meter for aircraft comprising in combination a rotatable shaft, adjustable driving means for rotating the same, an air screw mounted on said shaft for limited helicoidal motion therein, a contact carried by said air screw, a pair of spaced contacts yieldingly mounted on said shaft, a second contact on said air screw and a second pair of spaced contacts carried by said shaft, said last mentioned pair of contacts being spaced further apart than said first pair of contacts, means controlled by engagement of said first mentioned contact with either of said first mentioned pair of contacts for adjusting said driving means to nullify the helicoidal motion of said air screw on said shaft and to maintain the rotation of said screw in accordance with its theoretical pitch, and means responsive to the engagement of said second contact on said air screw with either of said second mentioned pair of contacts for increasing the rate of adjustment of said driving means initiated by engagement of the first contact of said air screw with one of said first pair of contacts.

PIERRE ERNEST MERCIER.
RENÉ PLANIOL.

Certificate of Correction

Patent No. 2,355,921.             August 15, 1944.

PIERRE ERNEST MERCIER ET AL.

It is hereby certified that errors appear in the printed specification of the above numbered patent requiring correction as follows: Page 4, first column, line 49, after the word "and" strike out the letter "f"; lines 74–75, for the term—

$$\text{``}f\left(\frac{VL}{\nu}\right)\text{''} \quad \text{read} \quad f\left(\frac{VL}{\nu}\right)$$

and that the said Letters Patent should be read with these corrections therein that the same may conform to the record of the case in the Patent Office.

Signed and sealed this 24th day of October, 1944.

[SEAL]

LESLIE FRAZER,
*Acting Commissioner of Patents.*